United States Patent [19]

Davis et al.

[11] Patent Number: 5,588,986
[45] Date of Patent: Dec. 31, 1996

[54] MASS OR ENERGY TRANSFER PROCESS USING FLUIDIZED BED

[75] Inventors: Howard P. Davis, Petersham Richmond, England; Wolfram Ruff, Stade, Germany

[73] Assignees: Euro-Matic Ltd., London, England; VAW Aluminium AG, Bonn, Germany

[21] Appl. No.: 364,220

[22] Filed: Dec. 27, 1994

Related U.S. Application Data

[63] Continuation-in-part of Ser. No. 76,481, Jun. 14, 1993, Pat. No. 5,376,165, which is a continuation of Ser. No. 767,043, filed as PCT/EP90/02088, Dec. 24, 1990, abandoned.

[51] Int. Cl.$^6$ .................... B01D 47/14; B01D 53/14
[52] U.S. Cl. ................ 95/211; 95/230; 95/263; 261/DIG. 72
[58] Field of Search ..................... 55/233; 95/1, 23, 95/211, 212, 231–233, 235, 236, 230, 263; 261/94–98, DIG. 72

[56] References Cited

U.S. PATENT DOCUMENTS

| | | | |
|---|---|---|---|
| 2,212,932 | 8/1940 | Faulie | 261/94 |
| 2,381,119 | 8/1945 | Dill | 34/10 |
| 3,122,594 | 2/1964 | Kielback | 55/91 |
| 3,350,075 | 10/1967 | Douglas | 261/DIG. 72 |
| 3,364,656 | 1/1968 | Whiton et al. | 261/DIG. 72 |
| 3,438,614 | 4/1969 | Lipinski | 261/98 |
| 3,768,234 | 10/1973 | Hardison | 55/91 |
| 3,911,066 | 10/1975 | Ireland, Jr. et al. | 261/94 |
| 5,376,165 | 12/1994 | Ruff et al. | 95/212 |

FOREIGN PATENT DOCUMENTS

| | | |
|---|---|---|
| 2269993 | 12/1975 | France . |
| 448380 | 8/1927 | Germany . |
| 846093 | 7/1952 | Germany . |
| 1085662 | 7/1960 | Germany . |
| 1226077 | 10/1966 | Germany . |
| 6918394 | 5/1969 | Germany . |
| 1544161 | 6/1970 | Germany . |
| 7227930 | 7/1972 | Germany . |
| 2447942 | 7/1979 | Germany . |
| 3024228 | 1/1982 | Germany . |
| 3244921 | 6/1984 | Germany . |
| 3613151 | 10/1987 | Germany . |
| 0610751A1 | 1/1994 | Germany . |
| 0865360 | 9/1981 | U.S.S.R. ............ 261/DIG. 72 |
| 1088763A | 2/1983 | U.S.S.R. . |
| 1041856 | 9/1983 | U.S.S.R. ............ 261/DIG. 72 |
| 1526786 | 12/1989 | U.S.S.R. ............ 261/DIG. 72 |
| 1178502 | 1/1970 | United Kingdom ...... 261/DIG. 72 |
| 1488834 | 10/1977 | United Kingdom . |
| WO91/08048 | 6/1991 | WIPO . |

OTHER PUBLICATIONS

Search Report for PCT/EP90/02088.
Letter from Tribe to Muller–Wolff, dated Mar. 2, 1993.
Letter from Tribe to Ludwig, dated Mar. 17, 1993.
Davis Declaration–Letter from Tribe to Moss, dated Mar. 1, 1993.
Davis Declaration–Purchase Order No. 9–DHO–8825 from Dakota Gasification.
Davis Declaration–Euro–Matic Ltd. Invoice WO4136, Dakota Gasification.
Davis Declaration–Euro–Matic Ltd. Invoice WO2637, Nekoosa Paper.
Davis Declaration–Pollution Engineering Magazine, Feb. 1990, p. 64.
Davis Declaration–Letter from Berube, re: advertisement in Pollution Engineering magazine.
Davis Declaration–Euro–Matic Ltd. Sales Brochure.
Davis Declaration–Euro–Matic Ltd. invoice WO4104, ARI Technology.
Davis Declaration–ARI Technology Order No. L 932, Jan. 2, 1990.
Davis Declaration Purchase Order No. 65888 from Reynolds Metals.
Davis Declaration–Euro–Matic Ltd. Invoice WO6185 to Reynolds Metals.
Davis Declaration–Euro–Matic Ltd. Invoice WO6217 to SE Technologies.
Davis Declaration–Euro–Matic Ltd. Invoice WO6009 Superior Environmental.
Davis Declaration–Morgan Grampian plc Invoice 0372634 to Euro–Matic Ltd.
Davis Declaration–Morgan Grampian plc, Process Engineering information request.
Davis Declaration–Pudvan Publishing Invoice No. 0013803 to Euro–Matic Ltd.
Davis Declaration–Letter from Davis to Gambos, dated Apr. 5, 1989.
Davis Declaration–Letter from Davis to Baker, dated Jul. 27, 1989.
Davis Declaration–Davis report re: /dakota Gasification, dated Sep. 1989.
Davis Declaration–Fax from Kuhn to Davis dated Jun. 22, 1982.

*Primary Examiner*—Robert Spitzer
*Attorney, Agent, or Firm*—Darby & Darby, P.C.

[57] ABSTRACT

A method for the design and performance of a process such as scrubbing, stripping, heat transfer from one stream to another, and removal of particulate constituents from a gas stream. The method includes using given values for various system parameters and/or selecting values for them and determining an optimum unknown value according to the following Equation:

$$\frac{\Delta P}{H_o} = v \left\{ \frac{C_1 \rho_p g}{\psi s} + \frac{C_2 \rho_g g}{\psi} + C_3 \rho_l g \left[ \frac{L}{G} \right] \right\}.$$

33 Claims, 15 Drawing Sheets

MASS OR ENERGY TRANSFER PROCESS USING FLUIDIZED BED

This application is a continuation-in-part of U.S. application Ser. No. 08/076,481, filed Jun. 14, 1993, now U.S. Pat. No. 5,376,165, hereby incorporated by reference, which is a continuation of U.S. application Ser. No. 07/767,043 filed Aug. 2, 1991, now abandoned, which is a continuation of PCT application serial no. PCT/EP09/02088, filed Dec. 24, 1990.

FIELD OF THE INVENTION

This invention is in the field of mass or energy transfer processes using fluidized beds of packing elements wherein a gas stream is introduced into a column or tower containing a bed of packing particles, and contacted with a liquid stream flowing countercurrently to the gas stream. The operating conditions of the column are such that the particles or elements are in the fluidized state.

BACKGROUND OF THE INVENTION

Mass/energy transfer processes are known wherein packing particles are placed in a column, or tower into which a gas phase and a liquid phase are introduced in countercurrent fashion. The operating conditions of the system are adjusted so that the bed of packing particles becomes fluidized. Such a system is used, for example, in scrubbing towers for removing undesired substances from gases. This type of system is generally more efficient than a conventional fixed packing system (containing nonfluidized particles and operating in a laminar or semi-turbulent model).

Spherical polypropylene particles have long been used in fluidized beds for gas scrubbing. A disadvantage of these systems is that they cannot sustain large pressure gradients. A high pressure gradient causes channeling and swirling to occur, whereby the particles in the fluidized bed are pushed against each other and wedged to one side in a single static mass of packing by the gas instead of remaining fluidized. Impurities and debris are deposited on these de-fluidized particles. Gas and/or liquid flowing through the particles form channels, and the efficiency of the process is lowered considerably. Also, any remaining fluidized particles need to be frequently replaced due to collisions in the gas swirling through the channels. An improvement on the spherical particles, however, is the use of ellipsoidal particles described in German patent 36 13 151. The use of hollow ellipsoids is considered particularly advantageous.

Application Ser. No. 08/076,481, incorporated by reference herein, is specifically directed to a process for taking advantage of the structure of ellipsoidal particles. In this process, a gas stream is introduced in a column packed with ellipsoid elements to remove heat, gaseous, liquid or particulate matter from a gas stream, or to add to the gas stream (i.e. to remove from the liquid stream) heat, vapor, or moisture. The method includes the steps of:

providing a tower having a bed with fluidizable hollow ellipsoidal packing with a long semi-axis and a short semi-axis;

introducing a liquid stream into the tower at a liquid flow rate L, and countercurrently introducing the gas stream into the tower at a gas flow rate G sufficient to maintain the bed in a fluidized state and a superficial gas velocity v; and adjusting the volume ratio of the liquid flow to gas flow to cause the ellipsoidal packing to circulate predominantly in the vertical direction relative to the long semi-axis and to maintain a pressure gradient $\Delta P/H_0$ across the depth of the fluidized bed of at least about 1500 Pa/m, and, simultaneously, to satisfy the equation:

$$L/G = K_1(\Delta P/H_0 v) + K_2.$$

L/G is the volume ratio of liquid to gas; $\Delta P$ is the pressure drop across the bed; $H_0$ is the bed height in a state of rest; v is the superficial gas velocity; and $K_1$ and $K_2$ are constants.

By adjusting the parameters set forth in the equation, a fluidized bed can be obtained that does not channel and where pressure gradients can be predicted and set above about 1300–1500 Pa/m. This can achieve significant reduction in tower dimensions (especially height) over traditional fixed packing systems and unstable fluid bed systems (such as those using spheres). Large pressure gradients favor mass and/or energy transfer, which is advantageous in these systems.

There is still a need, however, for a process that allows for the further improved design and/or operation of a heat/energy transfer system using a fluidized packing bed such that the system avoids channeling and optimizes turbulence, for example, by selecting and manipulating not only process operating conditions, but also properties of the packing elements employed such as shape, density, center of gravity or diameter. Such a process is especially useful to upgrade the efficiency of existing mass/transfer installations by choice of packing to be installed therein and/or manipulation of the nature of the fluids and operating parameters of the process.

SUMMARY OF THE INVENTION

The method described herein relates to the design and performance of a process selected from the group consisting of scrubbing (defined as absorption by a gas stream of impurities present in a liquid stream), stripping (defined as desorption or vaporization of impurities of a gas or liquid stream into a liquid or gas stream, respectively), heat transfer from one stream to another, and removal of particulate constituents from a gas stream. In these processes, a gas stream is introduced into a tower having a bed comprising fluidizable hollow packing elements of a preselected or predetermined geometry and weight, and a liquid stream is introduced countercurrently into said tower. The gas stream has a gas flow rate G that is at least sufficient to maintain the bed in a fluidized state, and a superficial gas velocity v that is at least sufficient to tumble the elements about their shorter axis (or axes) at a selected value of liquid stream (L) to gas stream (G) flow ratio (L/G). The method includes using given values for various system parameters and/or selecting values for them and then determining an optimum unknown value according to the following Equation 1:

$$\frac{\Delta P}{H_o} = v \left\{ \frac{C_1 \rho_p g}{\psi s} + \frac{C_2 \rho_g g}{\psi} + C_3 \rho_l g \left[ \frac{L}{G} \right] \right\}$$

wherein $\Delta P$ is the pressure drop across the bed;

$H_0$ is the bed height in a state of rest (not fluidized);

$C_1$ is a dimensionless constant;

$C_2$ is a system constant having units of seconds/meter (or equivalent);

$C_3$ is a system constant having units of seconds/meter (or equivalent);

s is an element slip function in units of length/unit time (e.g., meters/second);

ψ is a shape factor calculated as follows:
y/x, wherein x is the length of the shortest axis of the particles and y is the length of the longest axis of the particles at the center of symmetry;

$\rho_p$ is the density of the particles or packing elements;

$\rho_g$ is the density of the gas;

$\rho_l$ is the density of the liquid; and g is the gravitational constant.

It is highly desirable to achieve reduced tower dimensions and to have the value of $\Delta P/H_0$ be greater than 1300 Pa/m, preferably greater than 1500 Pa/m. Once the unknown variable has been determined, the process is advantageously carried out in accordance with the value obtained. Similarly, in an existing system (wherein the tower dimensions and/or the packing are given), process parameters such as L, G and/or V (or liquid or gas density) can be adjusted so that they satisfy Equation 1 to fine-tune operation of that system in an advantageous manner.

Preferred methods of determining constants in the equation are as follows, though other calculations may be made, if desired:

$$C_1 = 2.83 f/y(1-\epsilon_0)$$

where f is the ratio of volume to surface area of the packing elements;

$$C_2 = (Re_c)(\epsilon_0^2)(\epsilon_0 f/Y)$$

where $Re_c$ is the gas phase Reynolds coefficient, preferably calculated according to the formula:

$$\frac{\rho_g \epsilon_0 y}{\mu g}$$

$\epsilon_0$ is the voidage function (i.e., bed porosity at a state of rest); and μg is gas viscosity in newton seconds/meter$^2$ (or equivalent)

$C_3$ = (liquid viscosity/liquid surface tension) $\epsilon_0$ s is preferably calculated as follows:

$$s = \frac{U_R (\rho_p - \rho_g)}{\rho_B}$$

where $U_R$ is the relative velocity between gas and particle preferably calculated as $v-U_p$, where $U_p$ is packing element velocity; and $\rho_B$ is the average bed density, preferably calculated as $\rho_B = \rho_p(1-\epsilon_0) + (\rho_l \epsilon_0 h)$ where h is the liquid hold up in the bed.

The preferred values ranges of $C_1$, $C_2$, and $C_3$ are as follows:

$C_1 = 0.2-0.3$ $C_2 = 1.0-40$ seconds/meter $C_3 = 0.002-0.05$ seconds/meter

It will be understood by those skilled in this art that $C_1-C_3$ are "constants" with respect to the system being studied, but that as system parameters, such as those shown in the above preferred constant calculations, are changed, the values of $C_1-C_3$ also change.

DETAILED DESCRIPTION OF THE INVENTION

Figure 1:
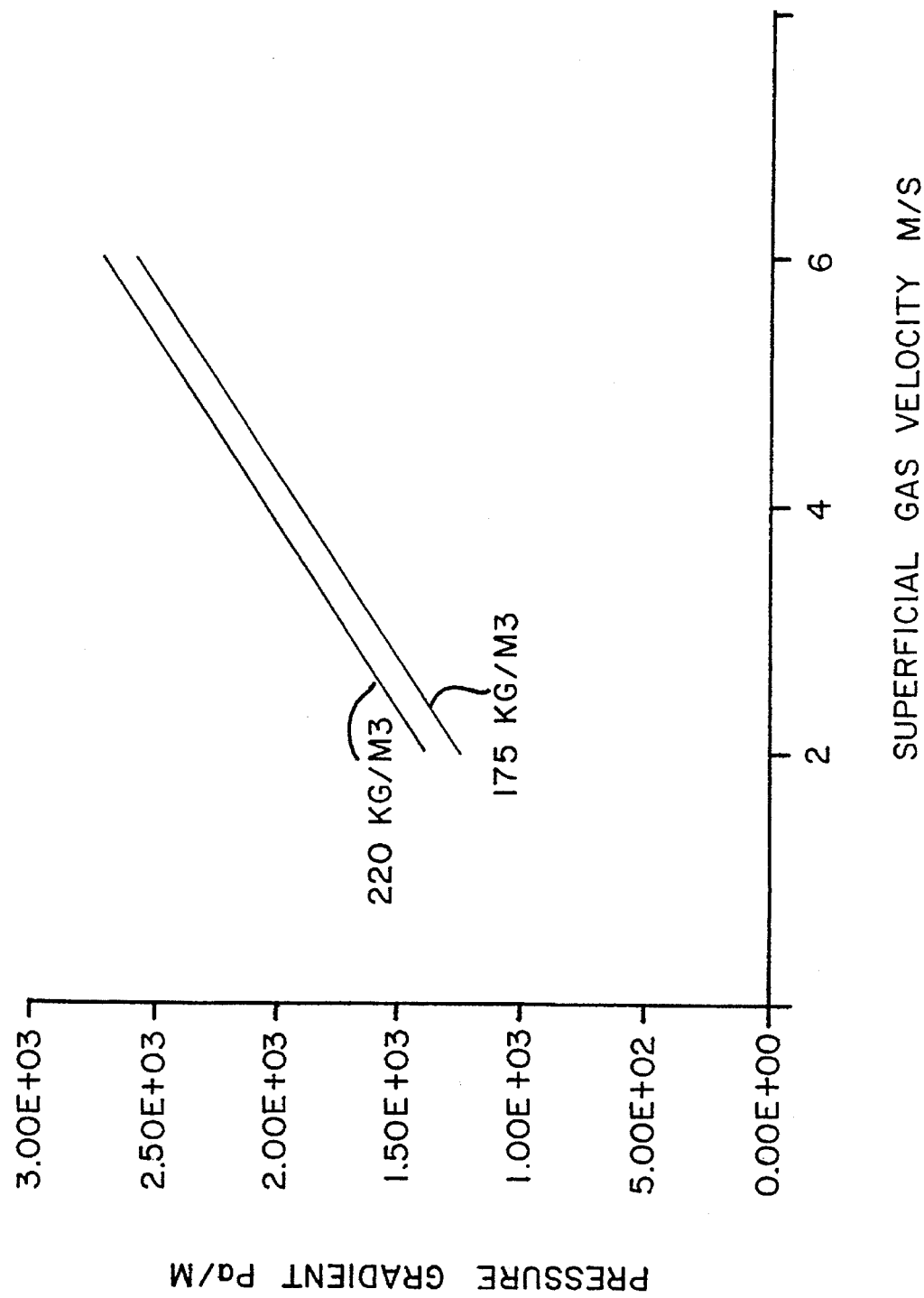
FIG. 1 is a graph showing the effect of particle density on turbulence ($\Delta P/H_0$) as a function of gas velocity at given particle size, shape and flow conditions where: x=50 mm and y/x=0.8, and (L/G)=2 L/m$^3$.

Fluidized beds using hollow particles of ellipsoid or ellipsoid-like shape, are used to provoke increased turbulence and increased contact between countercurrent gas and liquid flows in vertical towers. If turbulence of the particles is optimized, the dimensions of the tower bed height used can be reduced (or the volume of the phase into which mass or energy is transferred can be reduced, or the volume of the phase from which mass or energy is transferred can be increased), with resulting economic benefits. To accomplish this, the system must operate at a pressure gradient ($\Delta P/H_0$) above 1300 Pa/m (pascal/meter), and preferably above 1500 Pa/m. The higher the pressure gradient that can be used without causing channeling or swirling, the more efficient the transfer process. Thus, higher mass and/or heat transfer from the gas to liquid (or from the liquid to the gas) phase will occur. Below the $\Delta P/H_0$ 1300 Pa/m (and preferably 1500 Pa/m) threshold, transfer rates are much lower and require larger bed heights than those used for conventional fixed packings operating in a laminar or semi-turbulent mode. The higher limit is generally reached when the liquid stream is forced in the direction of the gas stream.

Each of mass transfer from gas to liquid (which takes place e.g. in absorption or scrubbing transfer processes) and mass transfer from liquid to gas (which takes place e.g. in desorption or stripping transfer processes) can be optimized above 1300 (or above 1500) Pascals/meter. Heat transfer from gas to liquid, or liquid to gas, can also be optimized above that level. Similarly, particle entrapment or transfer (usually from gas to liquid), even for very fine particles such as those of sub-micron size, can be optimized. At lower pressure gradients, the transfer efficiencies (measured e.g. by mass or energy transfer coefficients) per unit bed volume are far lower. It is thus important to operate as much above this threshold $\Delta P/H_0$ level as possible. In order to do this without swirling or channeling, one or more of (i) fluid flows, (ii) fluid densities, (iii) superficial gas velocity and (iv) shape, size and weight of the packing elements may need to be modified, so that the adjusted variable (or variables) satisfy Equation 1.

According to the present invention, the objective of keeping a high pressure gradient and efficient transfer in the tower can be accomplished by adjusting one or more of the design parameters using the Equation 1 shown above. The equation generally applies independently of the particular liquids and gases employed in the process (and independently of the component transferred from one phase to the other). However, it permits characteristics of these liquids and gases to be selected in a manner advantageous to the transfer efficiency.

The invention advantageously allows the process to be adjusted for densities of the component phases, as well as temperature and pressure of the particular system. It also allows a transfer system to be optimized by selecting appropriate packing element characteristics, in particular, packing element shape and/or density and/or size and/or center of gravity.

The transfer processes that the method of the invention is useful for include scrubbing, stripping, particle transfer and heat transfer.

Examples of scrubbing processes are gas scrubbing, chemical scrubbing, bio-scrubbing, and particle scrubbing. Gas scrubbing operations can remove for example undesired acid gases such as $SO_2$, $HCl$, $HF$, $H_2S$, and $CH_3CO_2H$ from a gas stream. Scrubbing can also be carried out to remove nitrogen oxides (NOX), $NH_3$, mercaptans, ethers or other soluble or insoluble organic or inorganic vapors or gases. In addition, gas scrubbing can be performed to remove condensable, soluble or recoverable organic vapors or gases such as formaldehyde, phenol, aromatics and chlorinated hydrocarbons.

In chemical scrubbing, a gas stream is reacted with an acid or alkali in the liquid stream.

In bio-scrubbing, biomass or bio-organisms in the liquid stream react with, or remove, gaseous or vapor components in the gas stream. An example is the scrubbing of alcohol with an appropriate biomass.

In particle scrubbing, fine metallic, organic or other type particles, usually larger than about 0.01 micron in diameter, are transferred from the gas stream to the liquid stream. This is useful in scrubbing gaseous combustion products.

Stripping processes involve removal or desorption of substances from water and other liquids. Substances removed include volatile or semi-volatile organic chemicals, such as aromatics (e.g., B.T.E.X. (benzene, toluene, ethylbenzene and xylene) and napthalenes), ketones, ethers, and alcohols. Inorganic stripping can be performed to remove, e.g., ammonia.

Heat transfer processes transfer heat by quick condensation, by evaporation, by direct contact between gas and liquid, or by any combination of convention, conduction, and radiation between gas and liquid.

Apart from the present invention, the kinetics of mass and/or energy transfer are governed by principles well-known in the art.

Equation 1 can be employed to select appropriate values for parameters designed to maintain efficient operation of the column to purify or cool liquids or gases of various viscosities, whether containing biomass or chemicals. Equation 1 allows manipulation of not only process parameters (such as temperature, pressure, fluid flows and gas velocity) or packing bed height, but also shape, size and density of the packing elements and density of the gas and/or liquid phase.

As evident from Equation 1, $\Delta P/H_0$ can be increased by increasing one or more of L/G, v, $\rho_g$, $\rho_p$, $\rho_1$. $\Delta P/H_0$ can also be increased by decreasing $\psi$. Further, according to the invention, values of $\psi$, $\rho_p$ and packing element size can be selected in order to obtain a stable fluid bed.

The invention can be used to design a transfer process for a new tower. The invention can also be used to retrofit an existing transfer process, such as converting a conventional static type gas scrubber to a fluidized bed scrubber, or to upgrade a fluidized bed type transfer system by changing, e.g., particle shape, density, or size. A system designed using the invention can co-optimize the efficiency of the transfer process and energy consumption by obtaining a stable fluidized bed at an appropriately high pressure gradient.

Bed stability for any scrubbing, stripping, heat transfer or particle removal system is maintained by selecting ellipsoidal-type particles, and employing suitable values for v, L and G, such as those in preferred ranges described herein.

The equation theoretically applies for all three dimensional members of the mathematical ellipsoid group, from spheres to virtual disks. In practice, neither virtual disks nor spheres are preferred, as described in more detail below. To fully optimize the turbulence and transfer process there are preferred size, shape and density ranges for the ellipsoidal (or similar) particles. It is apparent from the equation, for example, that reducing $\psi$ or increasing $\rho_p$ will raise $\Delta P/H_0$. As a result, the transfer coefficients in the particular transfer system will be raised in order to obtain a more efficient fluidized bed.

As shown by the equation, the ellipsoid particles will fluidize and tumble fully at different values of $\Delta P/H_0$ depending on their size, shape and density. Thus, different type particles will fluidize and tumble in a given system to different degrees, at different pressure gradients, and resulting in different transfer coefficients, under the same flow conditions.

For example, spheres (i.e., $\psi=1.0$) can destabilize the bed due to channelling, and "gulf-streaming" or "swirling". Disk type shapes ($\psi<0.3$) can also fluidize improperly. In general, denser, flatter, and larger, ellipsoids within the preferred ranges will provoke greater turbulence and hence transfer between phases.

The shape factor is preferably in the range $0.9 \geq \psi \geq 0.3$. The most preferred range is $0.8 \geq \psi \geq 0.5$. Provided that a sufficient number of terms of Equation 1 are assigned values, other parameters of the equation can be determined for a particular shape factor to ensure optimum bed stability and homogeneity. For example, see FIG. 14.

A preferred size range for the longest ellipsoid axis is:

$$125 \text{ mm} \geq y \geq 10 \text{ mm}$$

Sizes outside this range may lead to bed instability. For larger values, gas and liquid may be in turbulent contact with only a small number of particles, resulting in unacceptable channelling. Inefficiency and channelling may be seen with smaller values.

A preferred range for ellipsoidal particle density is $$80 \text{ kg/m}^3 \leq \rho_p \leq 500 \text{ kg/m}^3.$$

Below this range, there are often problems related to wall thickness, such as low packing element strength and life span. Above the range, there are often weight related problems, in particular energy loss and excess fluidizing velocity. Most preferred is the following range of packing element density:

$$125 \text{ kg/m}^3 \leq \rho_p \leq 350 \text{ kg/m}^3.$$

With these ranges, the density of the packing can be selected for optimum effect.

Depending on the transfer system, in particular the parameters included in Equation 1 above, as well as given characteristics of liquid and gas, such as viscosity etc., the $\Delta P/H_0$ value may range from the 800–1500 Pa/m threshold to well in excess of 4,500 Pa/m. To ensure homogeneous mixing in the bed and to ensure that the 1300–1500 Pa/m threshold is attained, however, it is preferable to operate from at least 20% to at least 100% above the pressure gradient at which the elements begin to tumble (i.e., $\Delta P/H_0$). For example a lightweight type ellipsoid particle can reach incipient fluidization at, e.g., 750 Pa/m (this will depend, in part, on particle density). The bed will need to be run at least about 100% above this to ensure sufficient turbulence for the transfer process (i.e., above about 1300–1500 Pa/m). A larger heavier particle on the other hand may fluidize at 1,000 Pa/m, requiring less additional gas or liquid velocity energy to ensure a homogeneous mixing and achieve the 1300–1500 Pa/m threshold.

For the preferred ellipsoid shape range, the superficial gas velocity, gas flow rate, and liquid flow rate, are as follows:

$$10 \text{ m/s} \geq v \geq 0.5 \text{ m/s}$$

$$25 \text{ dm}^3/\text{m}^3 \geq L/G \geq 0.5 \text{ dm}^3/\text{m}^3 \text{ (i.e., l/m}^3\text{)}$$

Values within these ranges can be selected to achieve and exceed the 1300–1500 Pa/m minimum threshold while maintaining bed stability.

Most preferred ranges are as follows:

$$8 \text{ m/s} \geq v \geq 1 \text{ m/s}$$

$$15 \text{ dm}^3/\text{m}^3 \geq L/G \geq 1 \text{ dm}^3/\text{m}^3$$

In addition, the densities of the liquid (and less frequently) of the gas phase can be changed by addition of appropriate thickeners or diluents. For example the density of ammonia-contaminated water can be increased by adding limestone to this liquid.

Grids or cages can be used as supporting structures in the tower. These are preferably at least 50% open, to avoid pressure loss and ensure even gas and liquid distribution.

As will be appreciated by one skilled in this art the ellipsoidal particles used in this invention do not have to be true ellipsoids. For example, it is possible to use a hybrid ellipsoid having one ellipsoidal shape forming half of the hybrid ellipsoid, and a different ellipsoidal shape forming the other half. (In that event, the larger of the two smaller axes can be used to determine X.) These and other variations will be apparent to one skilled in this art.

To cause optimum turbulence, it is preferred that the center of gravity of the particle generally be offset from the "symmetrical" center (i.e., center of symmetry). This can be achieved in regular ellipsoidal shapes defined by the equation group $$\frac{X^2}{A^2} + \frac{Y^2}{B^2} + \frac{Z^2}{C^2} = 1,$$

or well known variations of this equation including ellipsoidal type shapes and hybrids such as ovoids, eggs, pears, etc. All of these shapes, when hollow, will provoke high transfer when "operated" above about 1300–1500 Pa/m, and with appropriate selection of other process characteristics in accordance with Equation 1 will yield even higher transfer coefficients.

The more the center of gravity is offset from the center of symmetry, the greater the resulting pressure gradient $\Delta P/H_0$, until a point at which the bed becomes unstable and channelling occurs. While maintaining stability of an integral bed is important, some offset of the center of gravity from the center of symmetry will help raise the $\Delta P/H_0$ by "accelerating" the tumbling motion of the particles. Less offset reduces, or deadens, the tumbling, which lessens the $\Delta P/H_0$. To arrive at the required $\Delta P/H_0$ while accounting for an additional acentric factor, the following Equation 2 may be used:

$$\frac{\Delta P}{H_o} = v \left\{ \frac{C_1 \rho_p g}{s \psi \phi} + \frac{C_2 \rho_g g}{\psi \phi} + C_3 \rho_2 g \left[ \frac{L}{G} \right] \right\}$$

where $\phi$=acentric factor, and can be calculated by the following formula:

$$2 \frac{(y-r)}{y}$$

where y="ellipsoid" long axis (full axis)

r=radius of rotation, i.e., the distance along the long ellipsoid axis (y) from the center of gravity (COG) to the end farthest away from the center of gravity.

The following equation defines the point at which tumbling of ellipsoidal type shapes starts:

$$\frac{\Delta P}{H_o} > 5.66 \frac{(y-r)}{y^2} f \rho_B g$$

i.e., $\Delta P/H_0$ must exceed this value to start the tumbling action.
where
f=ratio of particle volume to surface area v/a, or
$\rho_B$=average fluid bed density, including the ellipsoid particles and the liquid hold up.

If the particle is symmetrical (i.e., where the COG is the same as the center of symmetry (COS)) this equation reduces to:

$$\frac{\Delta P}{H_o} > 2.83 \frac{f}{y} \rho_B g$$

It is seen that with offset shapes tumbling starts at lower $\Delta P/H_0$ values.

The rate of tumbling (R) is defined as follows:

$$R = \sqrt{\left[\frac{1}{r}\left(\left(\frac{y^2}{4(y-r)} \frac{1}{f \rho B} \frac{\Delta P}{H_o}\right) - 1.41 g\right)\right]}$$

This equation shows that tumbling rate and $\Delta P/H_0$ are interdependent, and that the greater the COG/COS offset along the major axis the faster the element tumbles at a given $\Delta P/H_0$.

For offset ellipsoids (whether symmetrically shaped, with an offset COG, with both a distended and/or egg shape, or other hybrid ellipsoids and offset COG), the $\Delta P/H_0$ rises more rapidly from the tumbling point.

Figure 15:
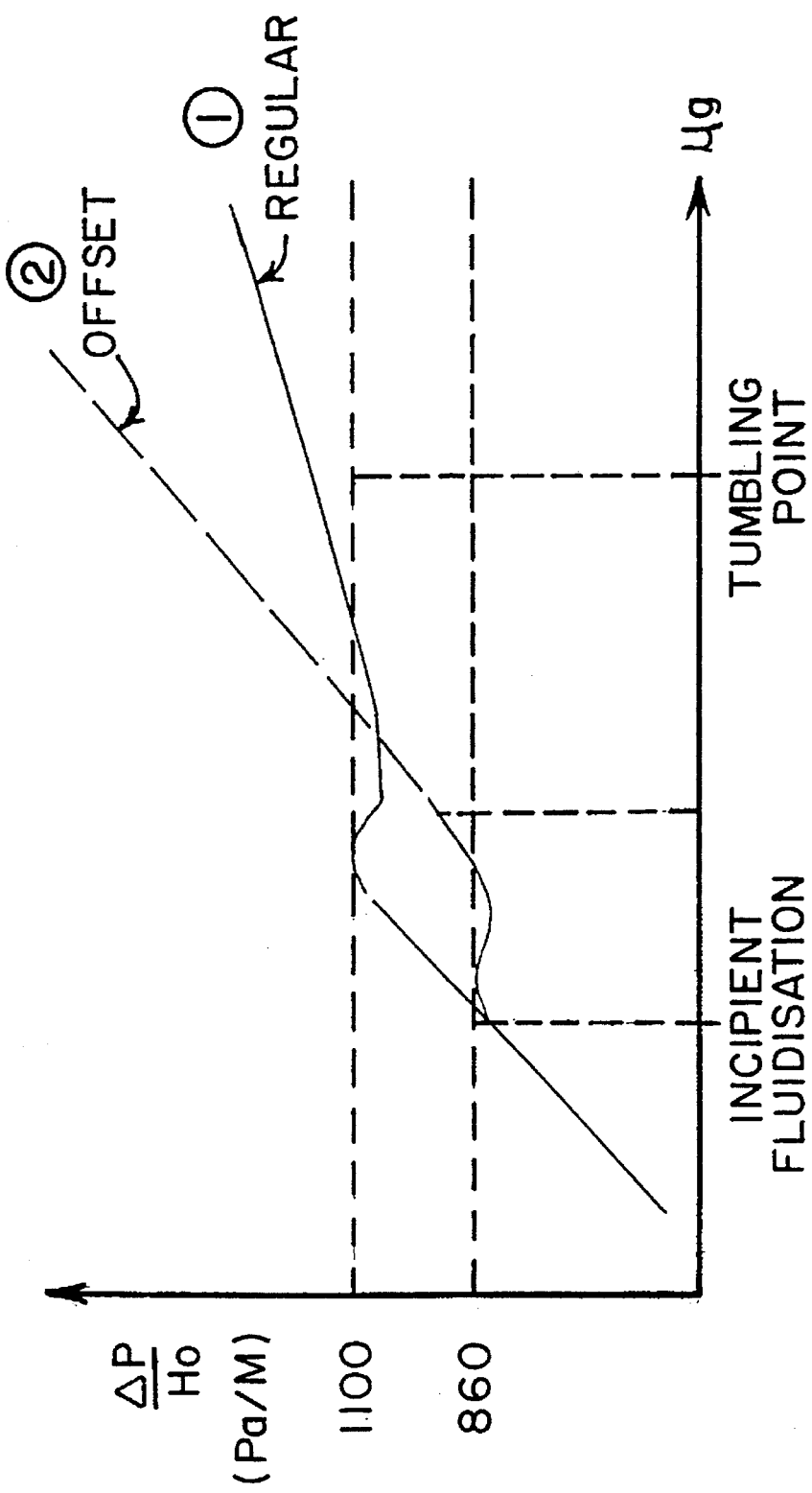
FIG. 15 is a graph showing results as center of gravity is offset from the center of symmetry.

FIG. 15 is a graph showing results as COG is offset from the center of symmetry. Incipient fluidization usually sets in at 700–900 Pa/m. If shapes are too far offset, it may not be possible to maintain bed stability. This is likely to occur when r>3y/4.

EXAMPLES

Tests were carried out in a tower designed to strip toluene from water using air at ambient temperatures. The tower was one meter in diameter, containing polypropylene or polyethylene ellipsoid elements in two beds each of 0.3 meter bed height. Various shape factors from 0.65 to 0.85 were tested. Packing weights were varied from 6 grams to 12 grams. Velocities were varied from about 1 to about 6 meters/second. The liquid velocity through the tower was 0.01 meters/second. The diameter of the elements was varied from about 45 mm to about 55 mm. Pressure drops were measured and pressure drops calculated on the basis of the bed height.

FIG. 1 shows the effect of packing element density on turbulence at given particle size, shape and flow conditions. Turbulence is directly related to pressure gradient. Two packing element densities are shown.

Figure 2:
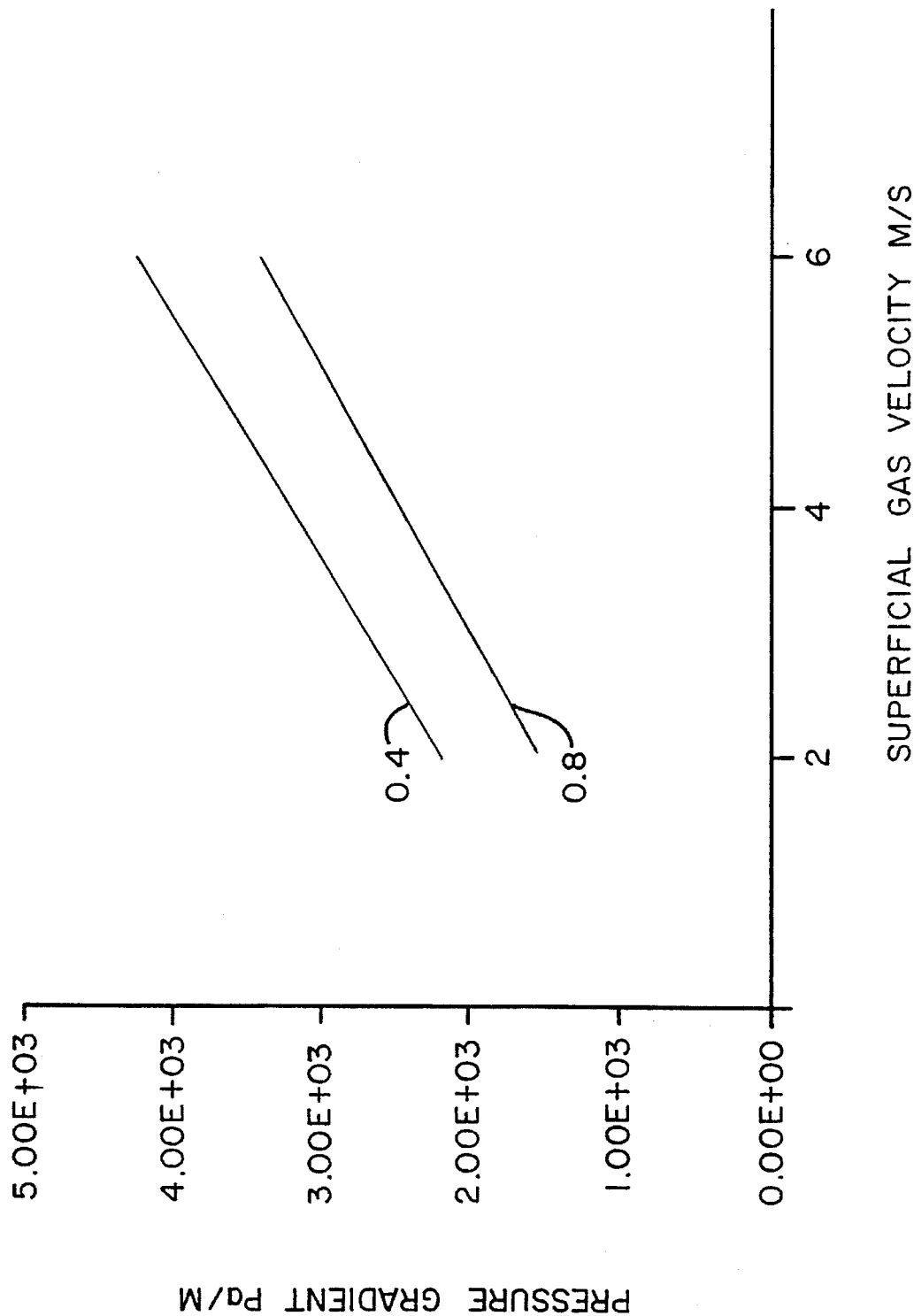
FIG. 2 is a graph showing the effect of particle shape on turbulence at various gas velocities where: x=50 mm, $\rho_p$=175 Kg/m$^3$, and (L/G)=4 L/m$^3$.
Figure 3:
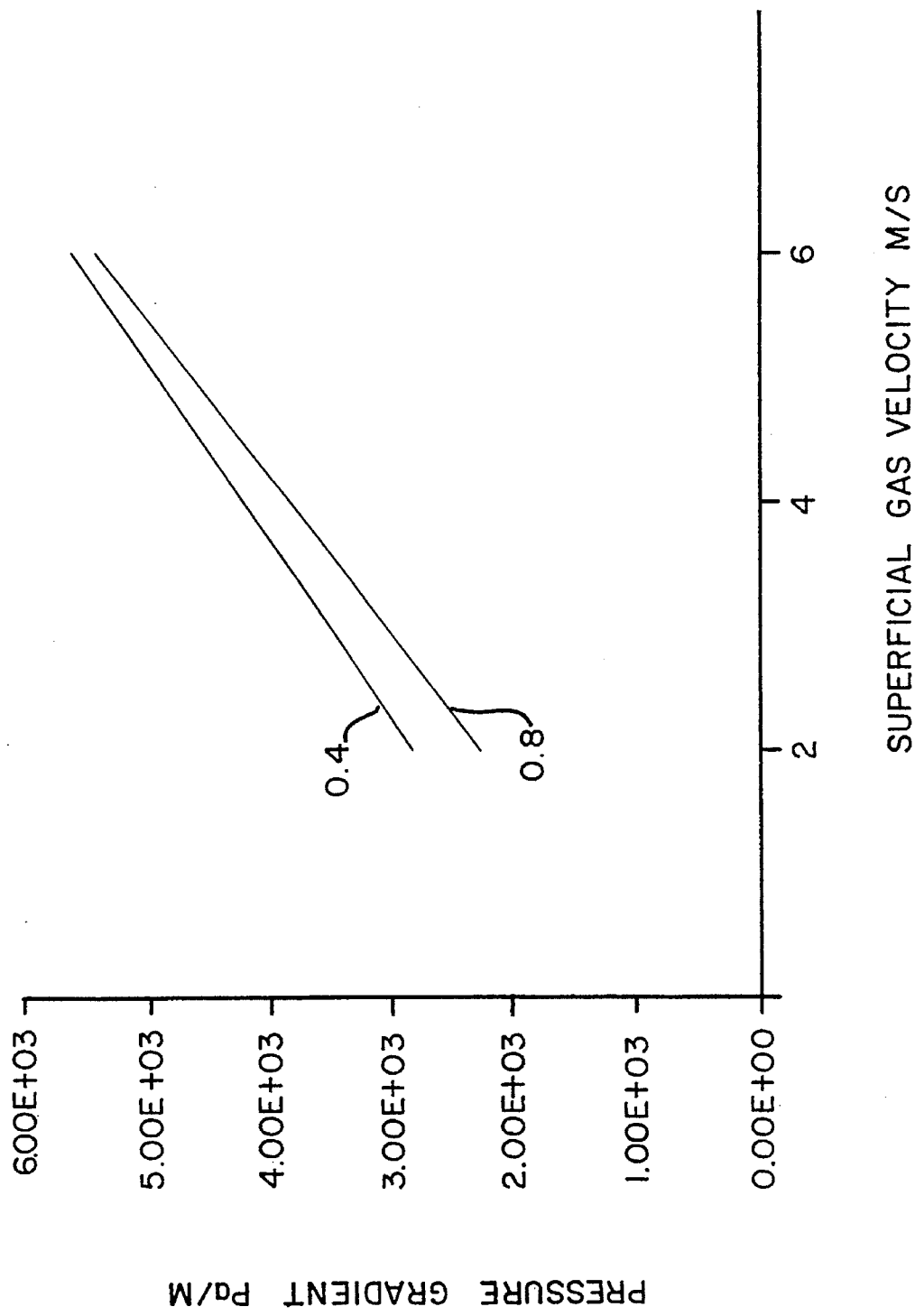
FIG. 3 is a graph showing the effect of particle shape on turbulence at various gas velocities where: x=30 mm, $\rho_p$=220 Kg/m$^3$, and (L/G)=16 L/m$^3$.
Figure 4:
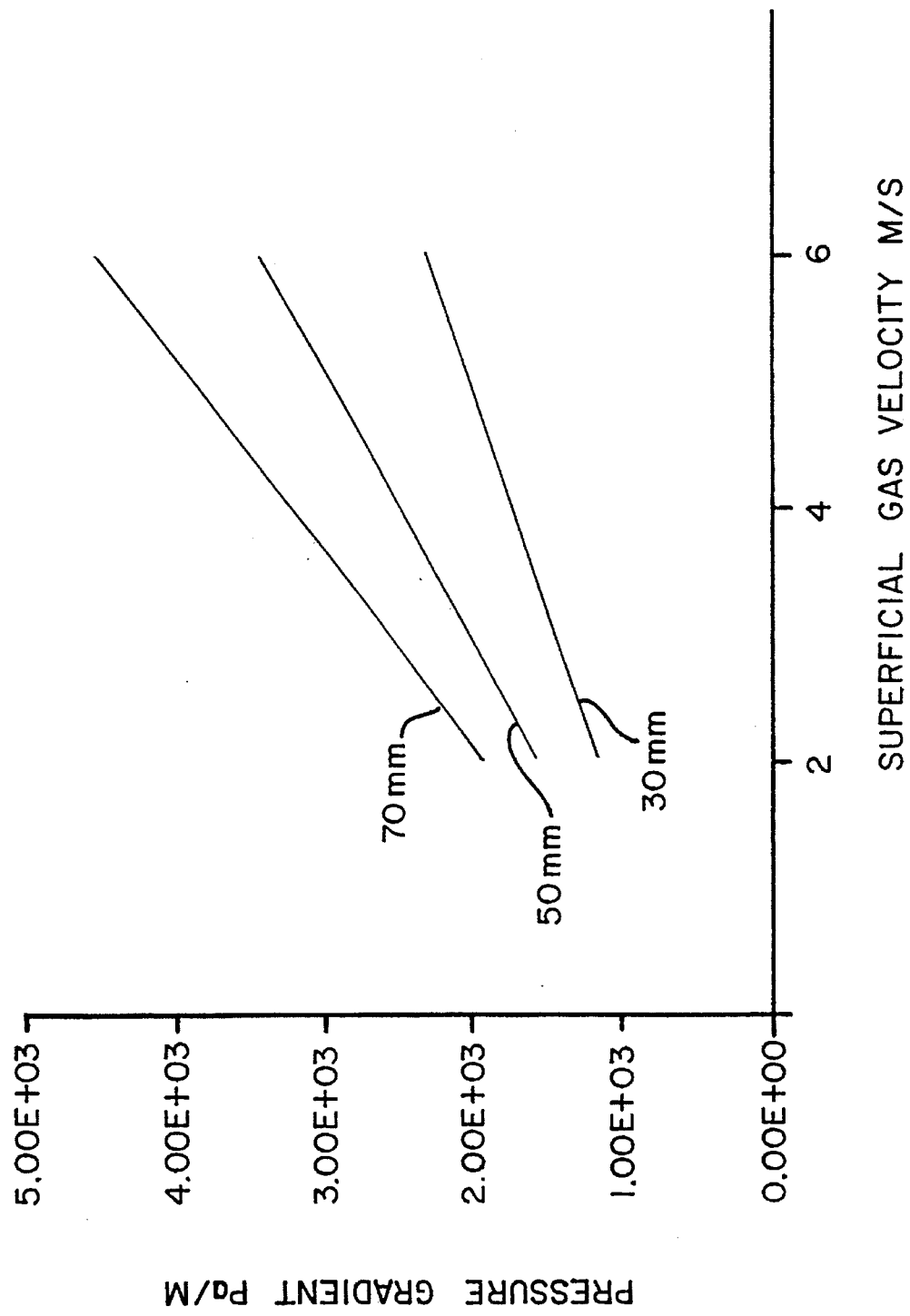
FIG. 4 is a graph showing the effect of particle shape on turbulence at various gas velocities where: y/x=0.8, $\rho_p$=175 Kg/m$^3$, and (L/G)=4 L/m$^3$.

The effect of shape on turbulence is shown in FIGS. 2, 3, and 4. Results are shown for 3 ellipsoid shapes. The effect of size (i.e., y) on turbulence is shown specifically in FIGS. 5 and 6.

FIG. 2 shows the improvement in turbulence possible by "squashing" or flattening the ellipsoid shape, i.e., resulting in a lower factor. Results for two shapes are shown, one towards the top of the preferred shape factor range (0.8), and one towards the bottom (0.4).

FIG. 3, compared with FIG. 2, shows that the turbulence advantage gained by decreasing the shape factor is reduced as the L/G ratio increases.

Figure 5:
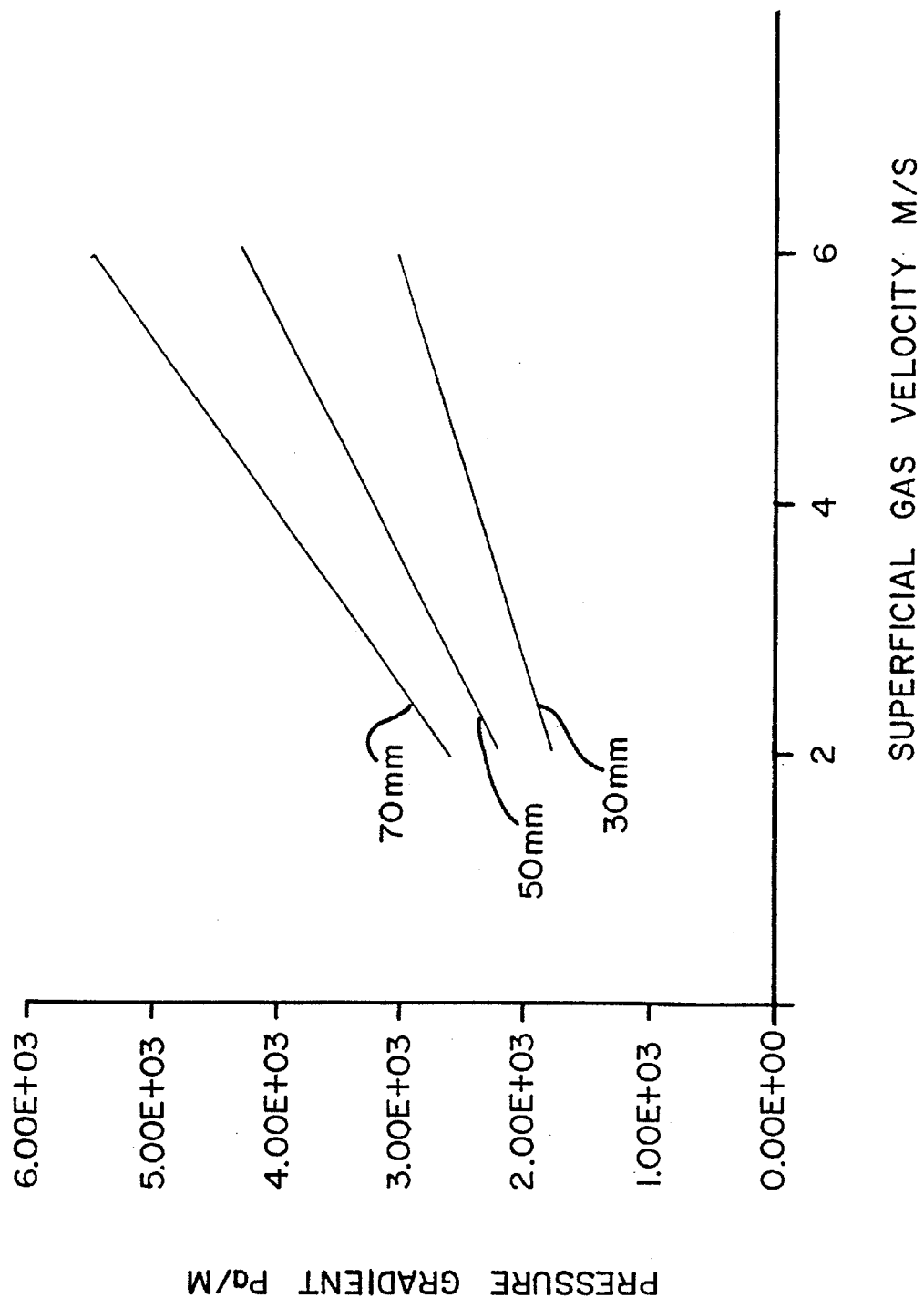
FIG. 5 is a graph showing the effect of particle size on turbulence at various superficial gas velocities where: y/x=0.4, $\rho_p$=175 Kg/m$^3$, and (L/G)=4 L/m$^3$.

FIGS. 4 and 5 show the turbulence advantage of a "flatter" ellipsoid at lower L/G values, and the turbulence advantage of larger ellipsoids (i.e., higher y value).

Figure 6:
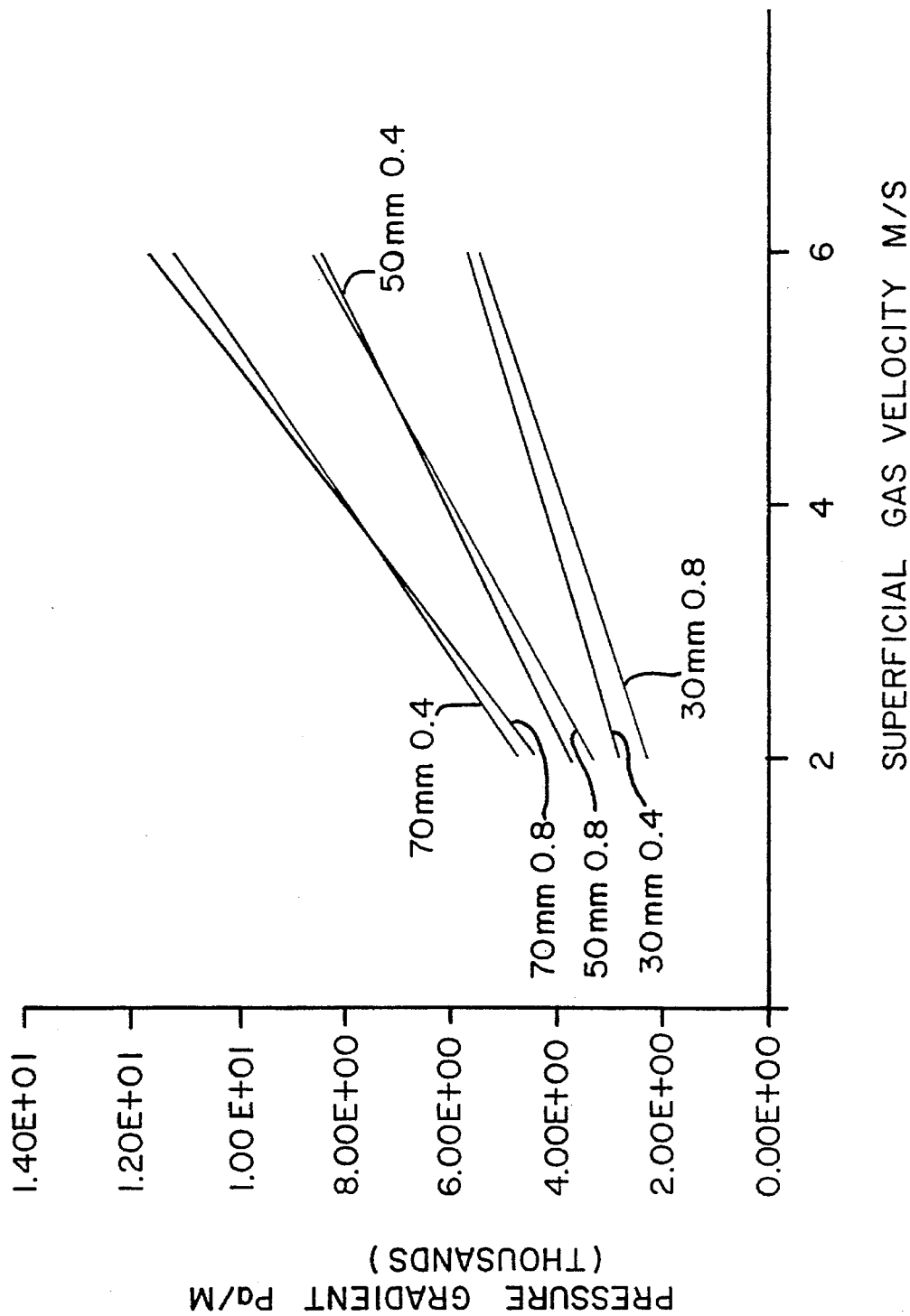
FIG. 6 is a graph showing the effect of particle shape on turbulence at various superficial gas velocities where: $\rho_p$=220 Kg/m$^3$, and (L/G)=16 L/m$^3$.

FIG. 6 shows the loss of turbulence advantage for particles having a lower shape factor at increased superficial gas velocity.

Figure 7:
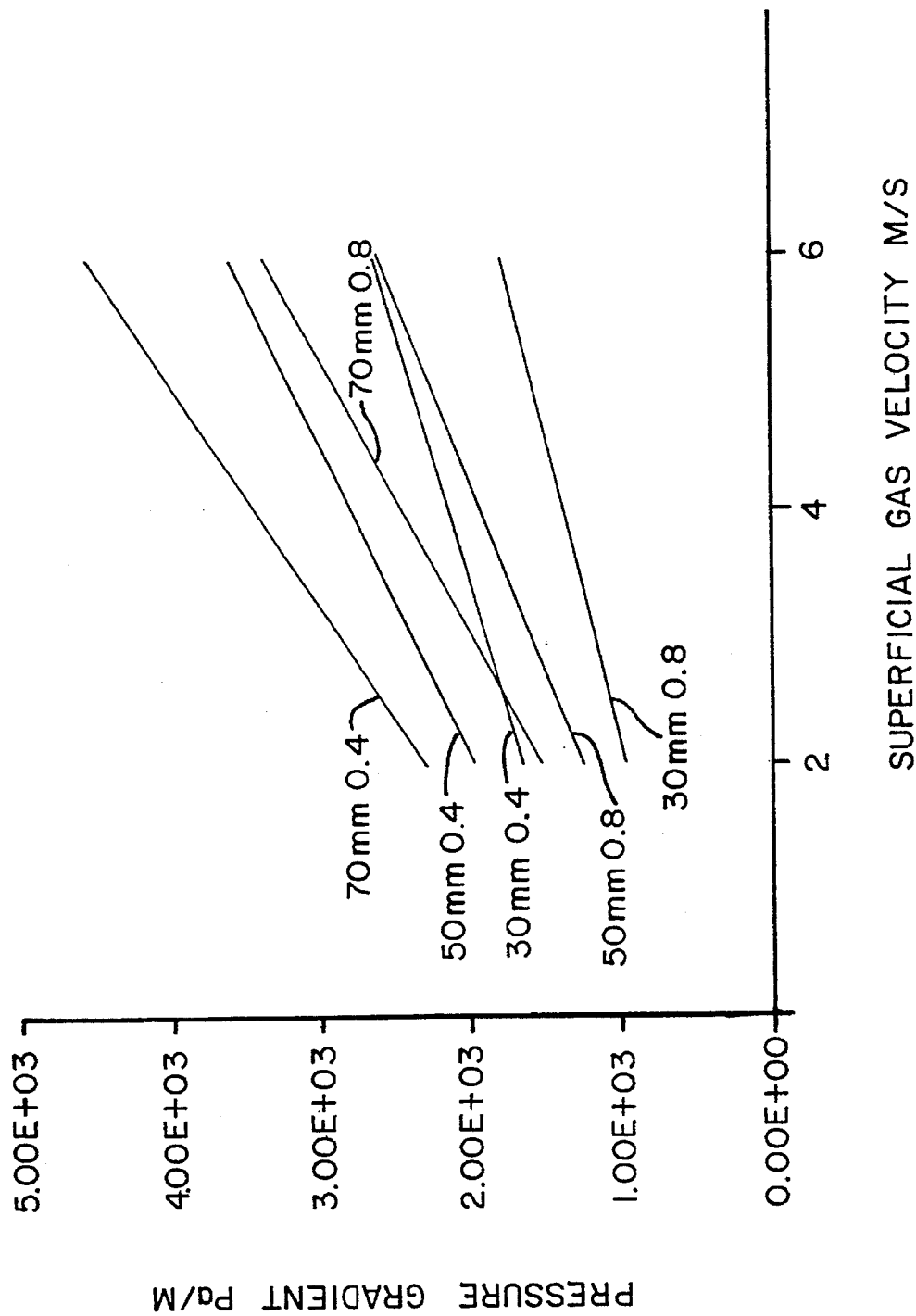
FIG. 7 is a graph showing variations in turbulence resulting for a relatively low density particle, at a relatively low L/G ratio where: $\rho_p$=175 Kg/m$^3$, and (L/G)=2 L/m$^3$.
Figure 8:
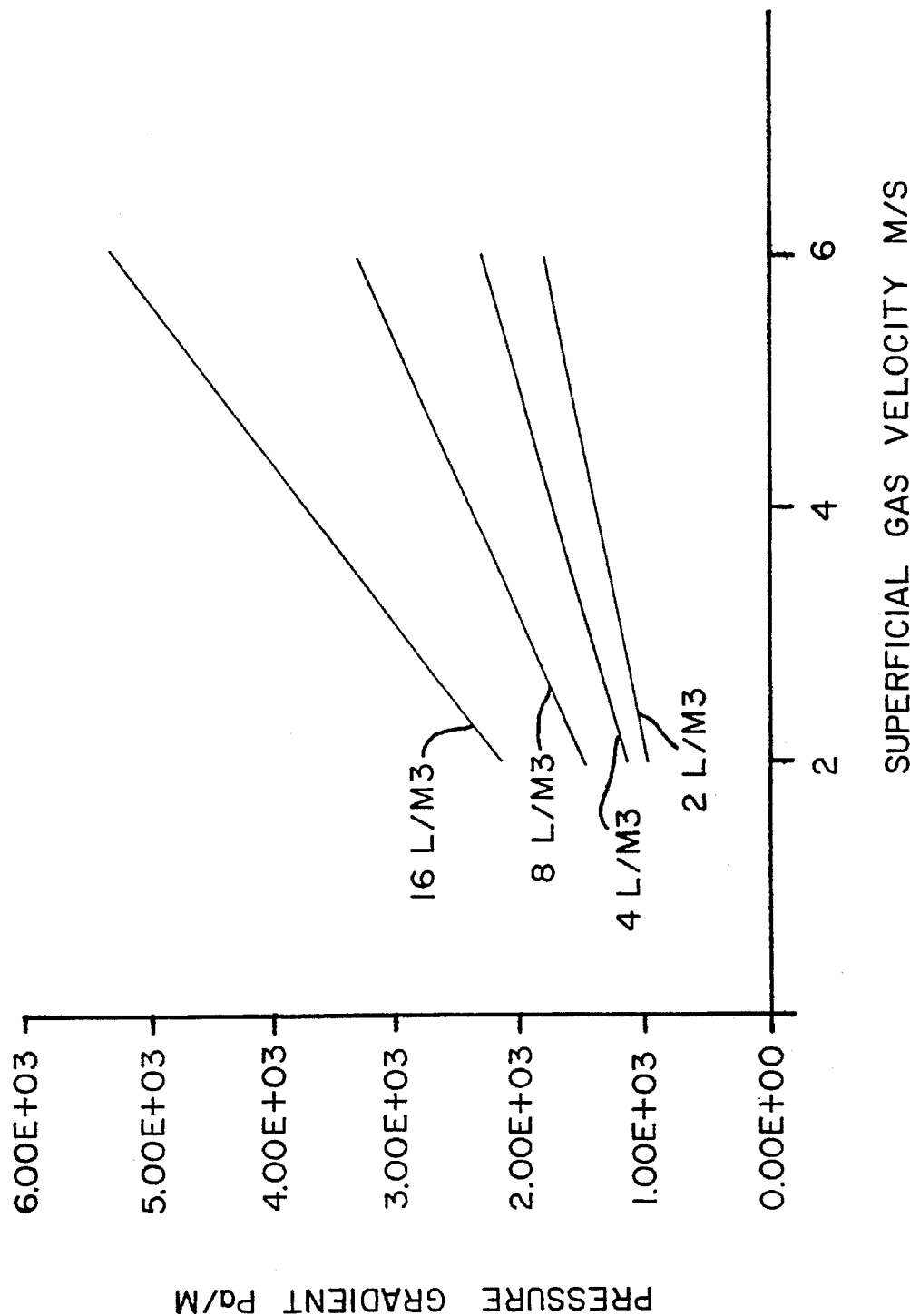
FIGS. 8 is a graph showing the effects of increasing L/G on turbulence (pressure gradient/unit height of bed) while varying superficial gas velocity where: x=30 mm, y/x=0.8, and $\rho_p$=175Kg/m$^3$.
Figure 9:
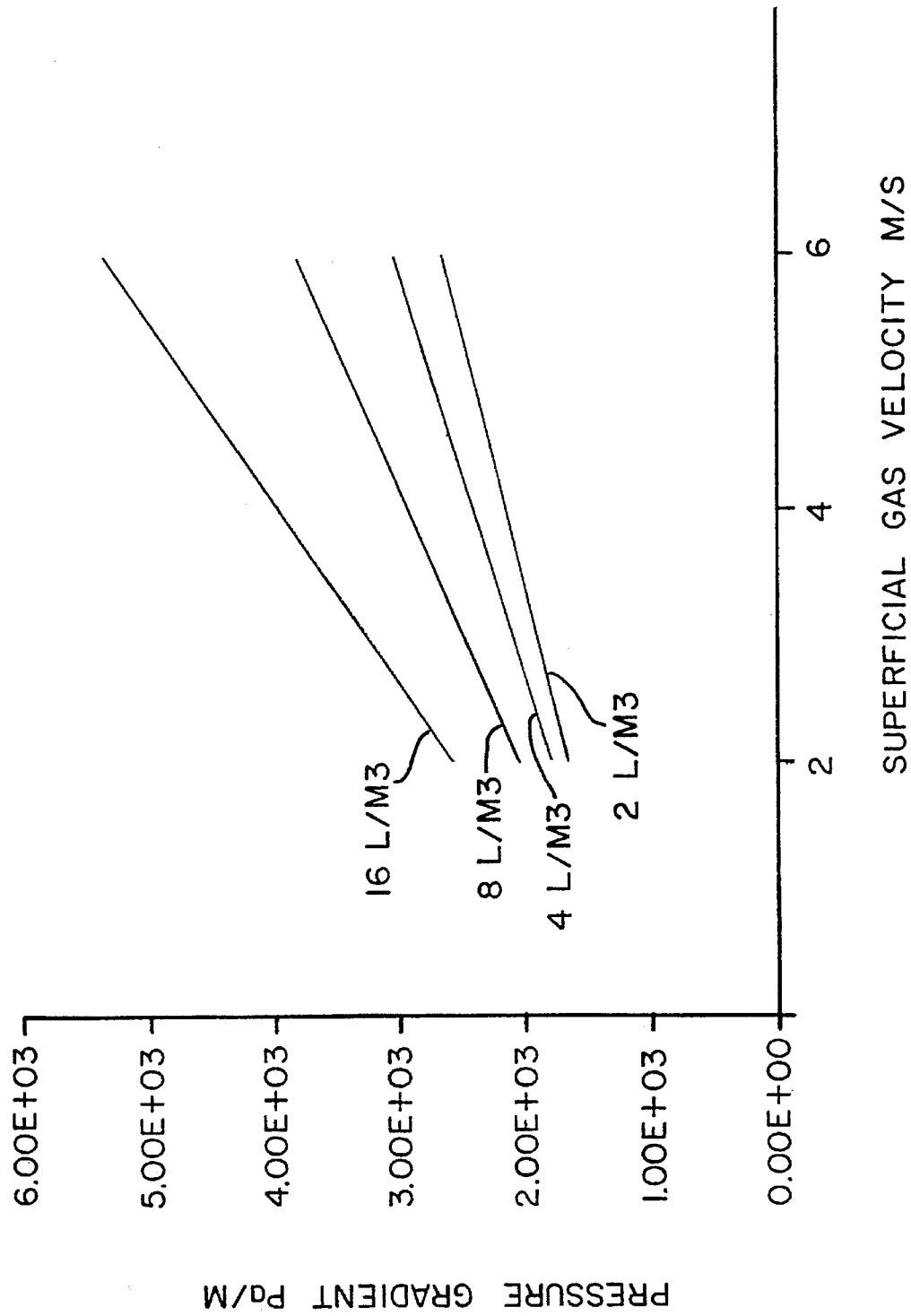
FIG. 9 is a graph showing the effects of increasing L/G on turbulence (pressure gradient/unit height of bed) while varying superficial gas velocity where: x=30 mm, y/x=0.4, and $\rho_p$=175 Kg/m$^3$
Figure 10:
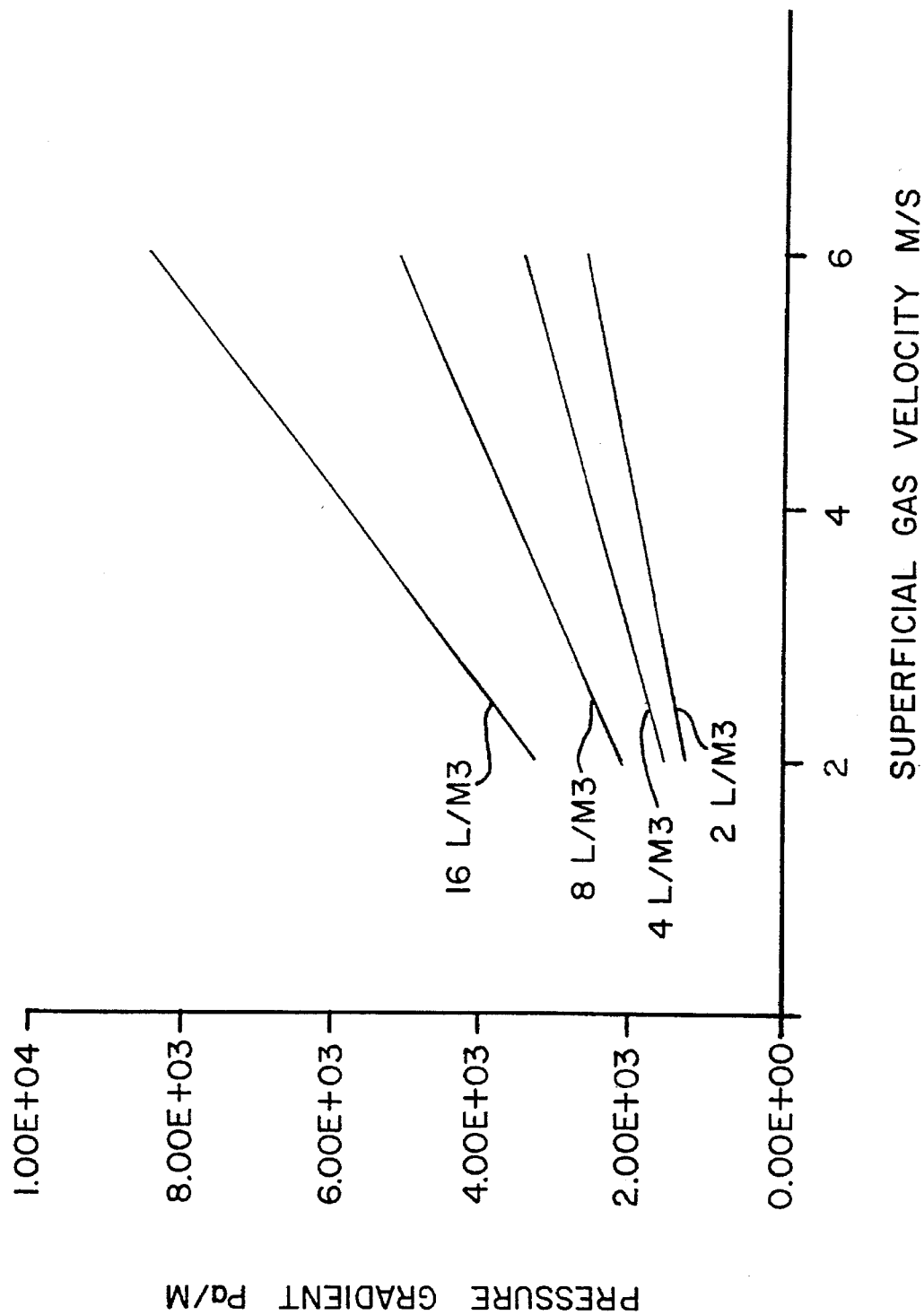
FIG. 10 is a graph showing the effects of increasing L/G on turbulence (pressure gradient/unit height of bed) while varying superficial gas velocity where: x=50 mm, y/x=0.8, and $\rho_p$=175 Kg/m$^3$.
Figure 11:
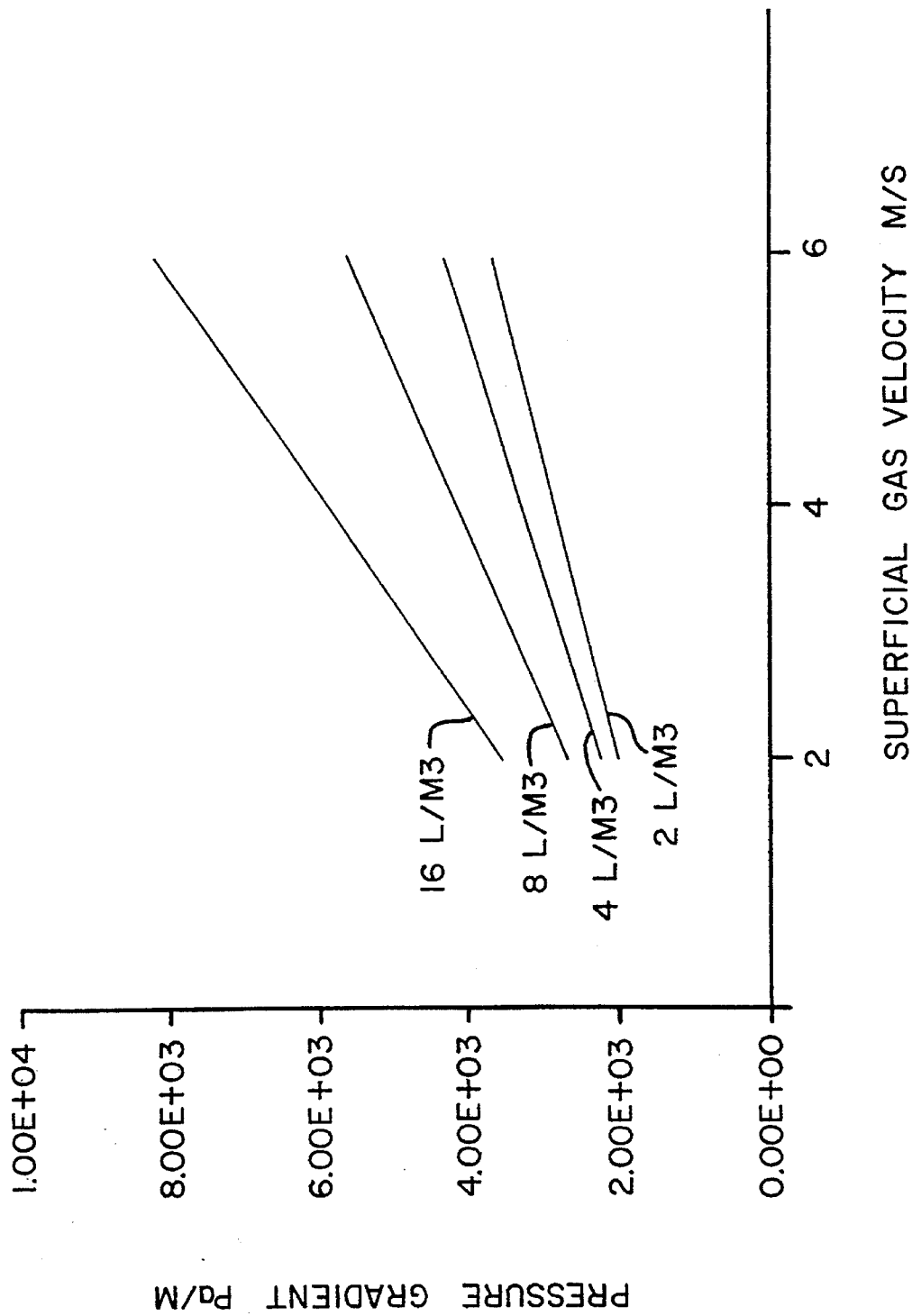
FIG. 11 is a graph showing the effects of increasing L/G on turbulence (pressure gradient/unit height of bed) while varying superficial gas velocity where: x=50 mm, y/x=0.4, and $\rho_p$=175 Kg/m$^3$.
Figure 12:
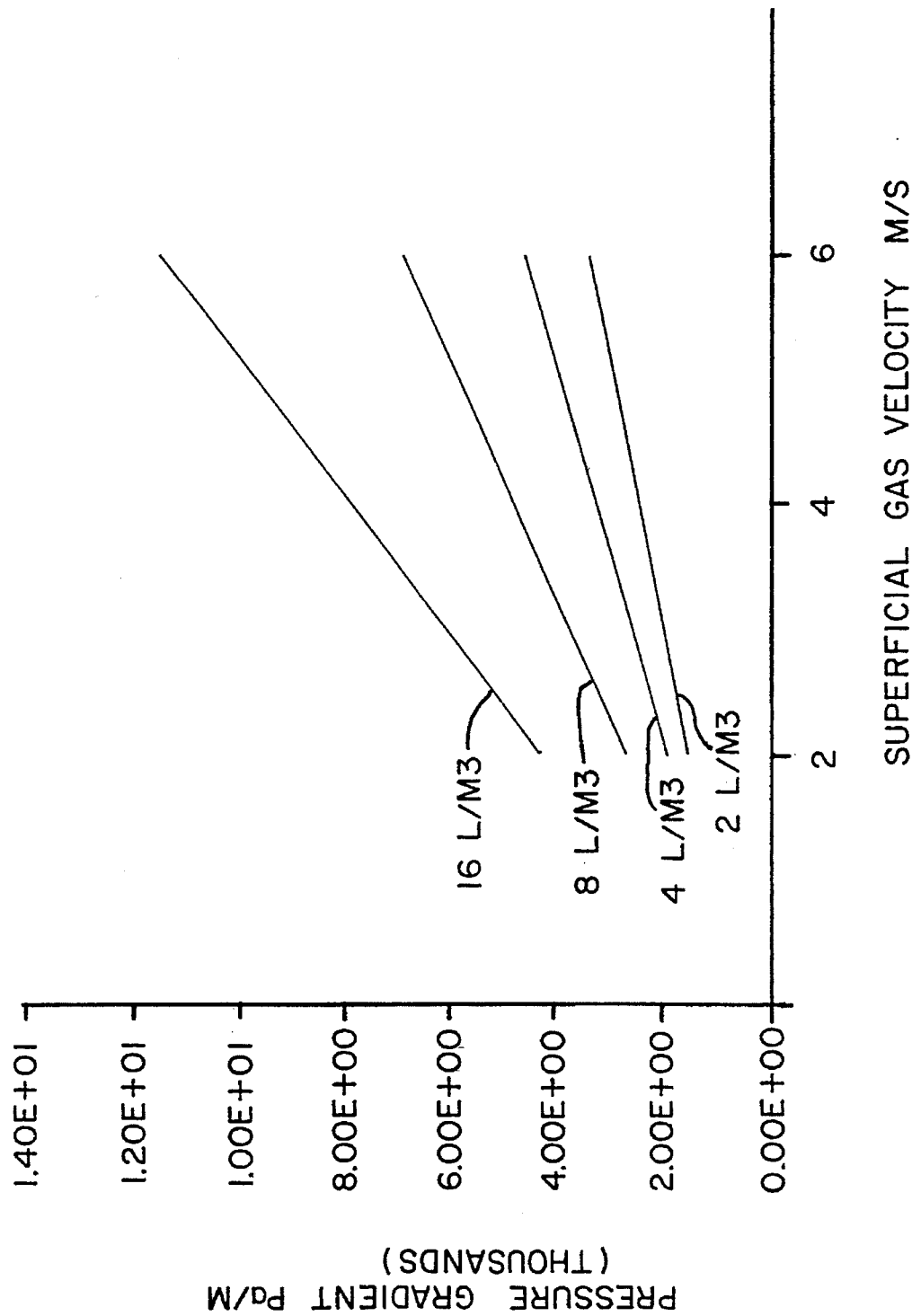
FIG. 12 is a graph showing the effects of increasing L/G on turbulence (pressure gradient/unit height of bed) while varying superficial gas velocity where: x=70 mm, y/x=0.8, and $\rho_p$=175 Kg/m$^3$.
Figure 13:
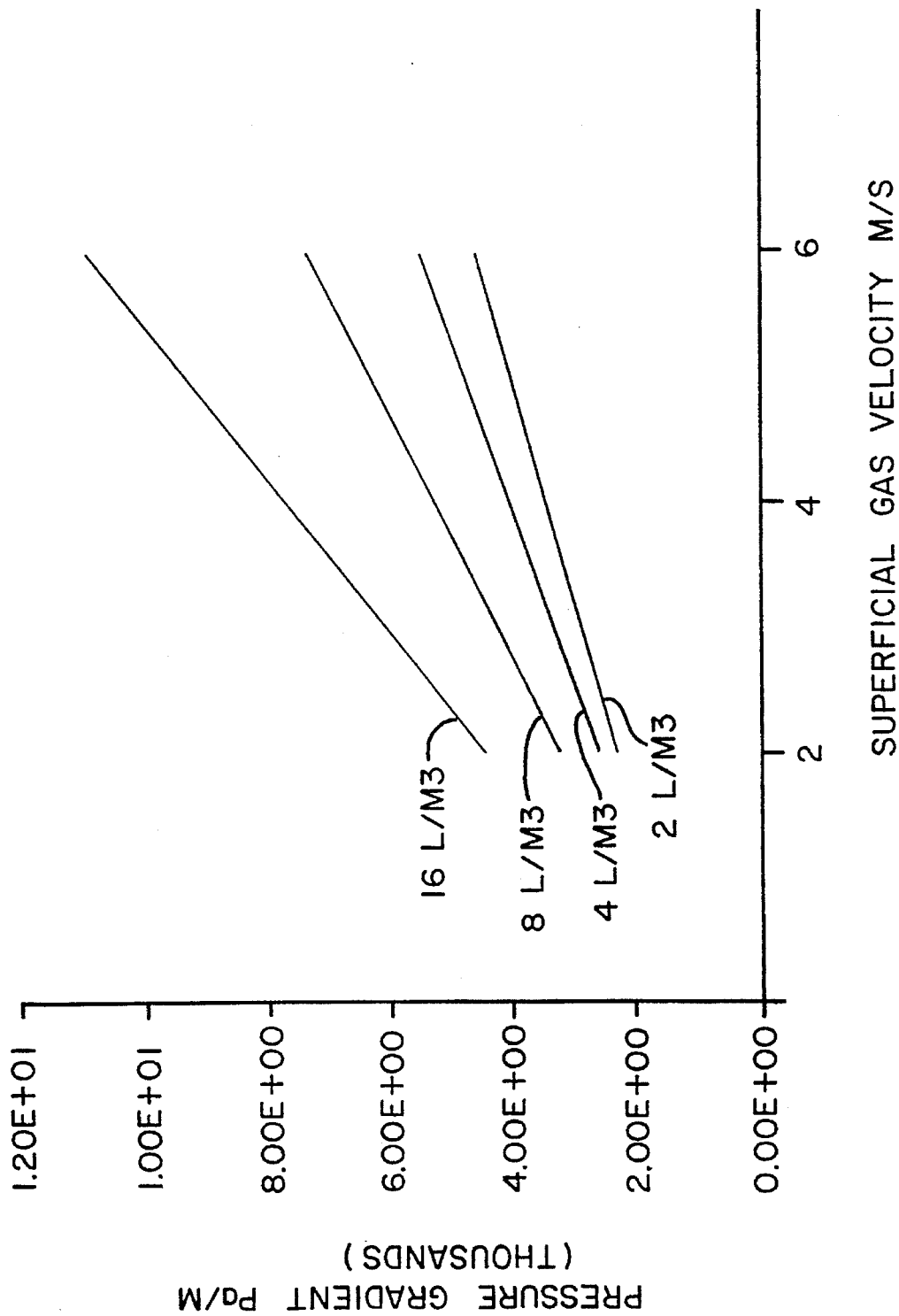
FIG. 13 is a graph showing the effects of increasing L/G on turbulence (pressure gradient/unit height of bed) while varying superficial gas velocity where: x=70 mm, y/x=0.4, and $\rho_p$=175 Kg/m$^3$.

FIG. 7 shows turbulence results for a lower density particle, at a lower L/G ratio. The results show that the pressure gradient can be raised above the 1300–1500 Pa/M threshold using different shape, density, or size of particle.

FIGS. 8–13 show the effects of L/G on turbulence while varying superficial gas velocity. Results are shown for particles of different shape factors, and length (y).

Figure 14:
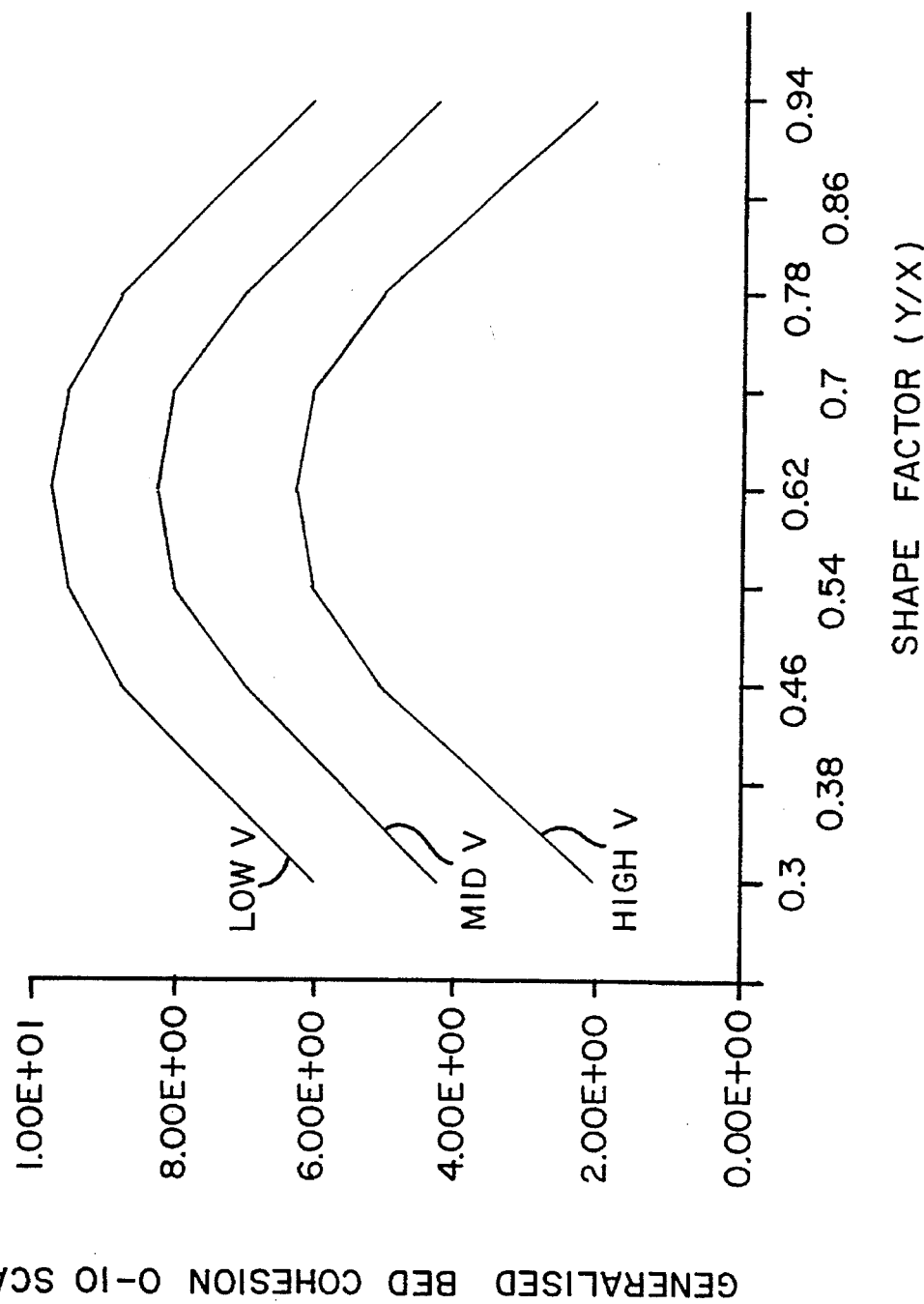
FIG. 14 is a graph of fluid bed stability vs. shape factor (y/x) for three different gas velocities (low v=2 m/s, mid v=4 m/s and high v=6 m/s).

FIG. 14 is a graph of fluid bed stability vs. shape factor at three different superficial gas velocities. The figure provides an example of how shape factors can be selected to maintain bed stability.

Example 2

It is often desirable, for mass transfer reasons, to operate a tower at 2000 Pa/m with about ½ meter of packing to achieve the desired efficiency (without having to change the fan feeding the tower). It is desirable to maintain the liquid flow at the preexisting rate to avoid changing the pump. The velocity v is thus predetermined by the gas flow and the diameter of the (existing) tower. It is assumed for purposes of this example, that the liquid and gas densities are predetermined. As a consequence, a packing element must be chosen to satisfy Equation 1. Use of Equation 1 allows selection of the correct ellipsoidal type element by selecting shape, density, diameter, and center of gravity offset. For example, hypothetical packing elements made of conventional materials with these properties can be "tested" using the equation to determine whether the desired objectives are achieved. For example, one candidate element has a relatively flat shape: a 0.4 shape factor, with a high density or about 200 kg/m³, a diameter of about 60 mm, and a center of gravity offset of ⅛ y from the center of symmetry. Other hypothetical elements are tested in the same fashion. The most easily produced shape that yields a satisfactory $\Delta P/H_0$ is then chosen for production and installation in the tower.

What is claimed is:

1. A method for performing a process selected from the group consisting of scrubbing, stripping, or heat transfer, wherein a gas stream is flowed through a column having a bed comprising fluidizable hollow packing elements, and a liquid stream is flowed through in a direction countercurrent to said gas stream into said column, said liquid stream having a liquid flow L and said gas stream having a gas flow G sufficient to maintain said bed in a fluidized state and a superficial gas velocity v; comprising (a) selecting an unknown value selected from the group consisting of L/G, v, $\rho_p$, $\psi$, s, $\rho_g$ and $\rho_L$ so that the following equation is satisfied for a predetermined value of $\Delta P/H_0$ greater than 1300 Pa/m³:

$$\frac{\Delta P}{H_o} = v \left\{ \frac{C_1 \rho_p g}{\psi s} + \frac{C_2 \rho_g g}{\psi} + C_3 \rho_L g \left[\frac{L}{G}\right] \right\}$$

wherein $\Delta P$ is the pressure drop across the bed;
$H_0$ is the bed height in a state of rest;
$C_1$ is a numerical constant;
$C_2$ is a numerical system constant having units of seconds/meter or equivalent;

$C_3$ is a system constant having units of seconds/meter;

s is an element slip function in units of meters/second or equivalent;

$\psi$ is a shape factor calculated as follows:
y/x, wherein x is the length of the short axis of the packing elements and y is the length of the long axis of the packing elements;

$\rho_p$ is the density of the packing elements;

$\rho_g$ is the density of the gas;

$\rho_L$ is the density of the liquid;

g is the gravitational constant; and (b) carrying out said process in accordance with said selection.

2. A method according to claim 1 wherein said scrubbing is selected from the group consisting of gas scrubbing, chemical scrubbing, particle scrubbing, and biomass scrubbing.

3. A method according to claim 1 wherein said process is gas scrubbing.

4. A method according to claim 1 wherein said process is stripping.

5. A method according to claim 1 wherein said process is heat transfer.

6. A method according to claim 1 wherein said shape factor is in the following range: $0.9 \geq \psi \geq 0.3$.

7. A method according to claim 1 wherein said shape factor is in the following range: $0.8 \geq \psi \geq 0.5$.

8. A method according to claim 1 wherein said density of said packing elements is as follows: $80 \text{ kg/m}^3 \leq \rho_p \leq 500 \text{ kg/m}^3$.

9. A method according to claim 1 wherein said density of said packing elements is in the following range: $125 \text{ kg/m}^3 \leq \rho_p \leq 350 \text{ kg/m}^3$.

10. A method according to claim 1 wherein $C_1$ is from 0.2–0.3.

11. A method according to claim 1 wherein $C_2$ is from 1.0–40 seconds/meter.

12. A method according to claim 1 wherein $C_3$ is from 0.002–0.05 seconds/meter.

13. A method according to claim 1 wherein $C_1$ is from 0.2–0.3, $C_2$ is from 1.0–40 seconds/meter, and $C_3$ is from 0.002–0.05 seconds/meter.

14. A method for improving a process selected from the group consisting of scrubbing, stripping, or heat transfer, wherein a gas stream is introduced into a tower having a bed comprising first fluidizable hollow first ellipsoidal packing elements, and a liquid stream is introduced countercurrently into said tower, said liquid stream having a liquid flow and said gas stream having a gas flow sufficient to maintain said bed in a fluidized state, comprising substituting second ellipsoidal packing elements having an altered shape factor, packing element density, or packing element size.

15. A method according to claim 14 wherein said shape factor is denoted $\psi$ and is in the following range: $0.9 \geq \psi \geq 0.3$.

16. A method according to claim 14 wherein said shape factor is denoted $\psi$ and is in the following range: $0.8 \geq \psi \geq 0.5$.

17. A method according to claim 14 wherein said packing element density is denoted $\rho_p$ and is as follows: $80 \text{ kg/m}^3 \leq \rho_p \leq 500 \text{ kg/m}^3$.

18. A method according to claim 14 wherein said packing element density is denoted $\rho_p$ and is in the following range: $125 \text{ kg/m}^3 \leq \rho_p \leq 350 \text{ kg/m}^3$.

19. A method for causing a gas stream to remove one or more of heat or impurities from a liquid stream or to relinquish one or more of heat or impurities to said liquid stream, the method comprising the steps of:

providing a tower having a bed comprising fluidizable packing elements;

introducing said liquid stream into said tower, said liquid stream having a liquid flow L;

countercurrently introducing said gas stream into said tower, said gas stream having a superficial gas velocity v and a gas flow G, said G being sufficient to maintain said elements in a fluidized state;

for given values of L, G, v, $\rho_g$, $\rho_L$, selecting a value for at least one of $\rho_p$, $\psi$, s, to satisfy the conditions:

$$\Delta P/H_o > 1300 \text{ Pa/m} \tag{i}$$

$$\frac{\Delta P}{H_o} = v \left\{ \frac{C_1 \rho_p g}{\psi s} + \frac{C_2 \rho_g g}{\psi} + C_3 \rho_L g \left[ \frac{L}{G} \right] \right\} \tag{ii}$$

wherein $\Delta P$ is the pressure drop across the bed;

$H_o$ is the bed height in a state of rest;

$C_1$ is a dimensionless constant;

$C_2$ is a system constant having units of seconds/meter or equivalent;

$C_3$ is a system constant having units of seconds/meter or equivalent;

s is an element slip function in units of length/unit time;

$\psi$ is a shape factor calculated as follows:
y/x, wherein x is the length of the shortest axis of the packing elements and y is the length of the longest axis of the packing elements at the center of symmetry;

$\rho_p$ is the density of the packing elements;

$\rho_g$ is the density of the gas;

$\rho_L$ is the density of the liquid; and g is the gravitational constant.

20. A method for performing a process selected from the group consisting of scrubbing, stripping, or heat transfer, wherein a gas stream is flowed through a column having a bed comprising fluidizable hollow packing elements, and a liquid stream is flowed through in a direction countercurrent to said gas stream into said column, said liquid stream having a liquid flow L and said gas stream having a gas flow G sufficient to maintain said bed in a fluidized state and a superficial gas velocity v; comprising (a) selecting an unknown value selected from the group consisting of L/G, v, $\rho_p$, $\psi$, s, $\rho_g$, $\rho_L$ and $\phi$ so that the following equation is satisfied for a predetermined value of $\Delta P/H_0$ greater than 1300 Pa/m$^3$:

$$\frac{\Delta P}{H_o} = v \left\{ \frac{C_1 \rho_p g}{s \psi \phi} + \frac{C_2 \rho_g g}{\psi \phi} + C_3 \rho_2 g \left[ \frac{L}{G} \right] \right\}$$

wherein $\Delta P$ is the pressure drop across the bed;

$H_0$ is the bed height in a state of rest;

$C_1$ is a numerical constant;

$C_2$ is a numerical system constant having units of seconds/meter or equivalent;

$C_3$ is a system constant having units of seconds/meter;

s is an element slip function in units of meters/second or equivalent;

$\psi$ is a shape factor calculated as follows:
y/x, wherein x is the length of the short axis of the packing elements and y is the length of the long axis of the packing elements;

$\rho_p$ is the density of the packing elements;

$\rho_g$ is the density of the gas;

$\rho_L$ is the density of the liquid;

g is the gravitational constant;

φ is an acentric factor calculated as follows:

2(y−r )/y where r is the distance along the long axis from the center of gravity of the packing elements to the end of the packing elements farthest away from the center of gravity; and (b) carrying out said process in accordance with said selection.

21. A method according to claim 20 wherein said scrubbing is selected from the group consisting of gas scrubbing, chemical scrubbing, particle scrubbing, and biomass scrubbing.

22. A method according to claim 20 wherein said process is gas scrubbing.

23. A method according to claim 20 wherein said process is stripping.

24. A method according to claim 20 wherein said process is heat transfer.

25. A method according to claim 20 wherein said shape factor ψ is in the following range: $0.9 \geq \psi \geq 0.3$.

26. A method according to claim 20 wherein said shape factor ψ is in the following range: $0.8 \geq \psi \geq 0.5$.

27. A method according to claim 20 wherein the density of said packing elements $\rho_p$ is as follows: $80 \text{ kg/m}^3 \leq \rho_p \leq 500 \text{ kg/m}^3$.

28. A method according to claim 20 wherein the density of said packing elements $\rho_p$ is in the following range: $125 \text{ kg/m}^3 \leq \rho_p \leq 350 \text{ kg/m}^3$.

29. A method according to claim 20 wherein $C_1$ is from 0.2–0.3.

30. A method according to claim 20 wherein $C_2$ is from 1.0–40 seconds/meter.

31. A method according to claim 20 wherein $C_3$ is from 0.002–0.05 seconds/meter.

32. A method according to claim 20 wherein $C_1$ is from 0.2–0.3, $C_2$ is from 1.0–40 seconds/meter, and $C_3$ is from 0.002–0.05 seconds/meter.

33. A method for causing a gas stream to remove one or more of heat or impurities from a liquid stream or to relinquish one or more of heat or impurities to said liquid stream, the method comprising the steps of:

providing a tower having a bed comprising fluidizable packing elements;

introducing said liquid stream into said tower, said liquid stream having a liquid flow L;

countercurrently introducing said gas stream into said tower, said gas stream having a superficial gas velocity v and a gas flow G, said G being sufficient to maintain said elements in a fluidized state;

for given values of L, G, v, $\rho_g$, $\rho_L$, selecting a value for at least one of $\rho_p$, ψ, s, and φ to satisfy the conditions:

$$\Delta P/H_o > 1300 \text{ Pa/m} \quad \text{(i)}$$

$$\frac{\Delta P}{H_o} = v \left\{ \frac{C_1 \rho_p g}{s \psi \phi} + \frac{C_2 \rho_g g}{\psi \phi} + C_3 \rho_2 g \left[ \frac{L}{G} \right] \right\} \quad \text{(ii)}$$

wherein

ΔP is the pressure drop across the bed;

$H_0$ is the bed height in a state of rest;

$C_1$ is a dimensionless constant;

$C_2$ is a system constant having units of seconds/meter or equivalent;

$C_3$ is a system constant having units of seconds/meter or equivalent;

s is an element slip function in units of length/unit time;

ψ is a shape factor calculated as follows:

y/x, wherein x is the length of the shortest axis of the packing elements and y is the length of the longest axis of the packing elements at the center of symmetry;

$\rho_p$ is the density of the packing elements;

$\rho_g$ is the density of the gas;

$\rho_L$ is the density of the liquid;

g is the gravitational constant; and

φ is an acentric factor calculated as follows:

2(y−r )/y where r is the distance along the long axis from the center of gravity of the packing elements to the end of the packing elements farthest away from the center of gravity.

* * * * *